US005552010A

United States Patent [19]

Kajikawa et al.

[11] Patent Number: 5,552,010

[45] Date of Patent: Sep. 3, 1996

[54] METHOD FOR PRODUCING TILE CARPET

[75] Inventors: Teruo Kajikawa, Yokosuka; Yasuhiko Ganno, Ebina; Junichi Takeda, Kitakatsuragi-gun; Syuichi Yonezawa, Hashimoto, all of Japan

[73] Assignees: Suminoe Orimono Kabushiki Kaisha, Osaka, Japan; Nippon Petrochemicals Co., Ltd., Tokyo, Japan

[21] Appl. No.: 157,047

[22] PCT Filed: Apr. 2, 1993

[86] PCT No.: PCT/JP93/00424

§ 371 Date: Dec. 1, 1993

§ 102(e) Date: Dec. 1, 1993

[87] PCT Pub. No.: WO93/19654

PCT Pub. Date: Oct. 14, 1993

[30] Foreign Application Priority Data

Apr. 2, 1992 [JP] Japan .................................... 4-080752

[51] Int. Cl.[6] .................................................... B32B 31/08

[52] U.S. Cl. ........................... 156/231; 156/72; 156/238; 156/247; 156/344; 156/322; 156/540; 156/327

[58] Field of Search ............................ 156/72, 231, 238, 156/247, 344, 322, 540, 327, 583.5, 582

[56] References Cited

U.S. PATENT DOCUMENTS

| | | | |
|---|---|---|---|
| 3,717,524 | 2/1973 | Culp | 156/72 |
| 3,723,213 | 3/1973 | Hoey | 156/72 |
| 3,728,182 | 4/1973 | Wisotzky | 156/72 |
| 3,728,204 | 4/1973 | Cochran, II | 156/72 X |
| 3,732,135 | 5/1973 | Ernst et al. | 156/72 |
| 3,732,136 | 5/1973 | Lord | 156/72 |
| 3,733,226 | 5/1973 | Stoller | 156/72 |
| 3,925,130 | 12/1975 | Brown | 156/305 |
| 3,953,269 | 4/1976 | Queen et al. | 156/79 |
| 4,081,579 | 3/1978 | Queen et al. . | |
| 4,123,313 | 10/1978 | Queen et al. | 156/498 |
| 4,171,395 | 10/1979 | Tillotson | 156/72 X |
| 4,347,275 | 8/1982 | Kajikawa | 428/95 X |
| 4,576,665 | 3/1986 | Machell | 156/72 X |
| 4,578,132 | 3/1986 | Van Uden | 156/72 |
| 4,731,143 | 3/1988 | Cross | 156/231 X |
| 4,872,930 | 10/1989 | Kajikawa | 156/72 |
| 5,198,277 | 3/1993 | Hamilton | 428/92 X |
| 5,204,155 | 4/1993 | Bell et al. | 428/95 X |

FOREIGN PATENT DOCUMENTS

| | | | |
|---|---|---|---|
| 56-37806B | 9/1981 | Japan . | |
| 57-59072B | 12/1982 | Japan . | |
| 1264840 | 10/1989 | Japan | 156/72 |
| 0766467 | 1/1957 | United Kingdom | 156/72 |

OTHER PUBLICATIONS

Japanese International Search Report.

*Primary Examiner*—James Engel
*Assistant Examiner*—Steven J. Helmer
*Attorney, Agent, or Firm*—Scully, Scott, Murphy & Presser

[57] ABSTRACT

As a method for producing a tile carpet having a a lining layer, there is provided a means for obtaining a tile carpet superior in the uniformity of thickness and adhesion of the lining layer and also superior in all of standing stability, shape and dimensional stability and durability, in high applicability of a sealing material in carpet cloth and a lining material and that in high production efficiency. The method of the present invention for producing such tile carpet comprises applying a heat-melted, amorphous olefin polymer composition (11) onto a travelling endless belt (3), then laminating onto this coating surface a carpet cloth (1) which has been sealed beforehand with an amorphous olefin polymer composition (7), to obtain an integral laminate, thereafter cooling the laminate forcibly using a cooling plate (14), separating the laminate from the endless belt (3) and cutting it into a tile shape.

13 Claims, 2 Drawing Sheets

1a 5a 5b 9 8 4 2 6 7 A 1 10 12 13 3 11 14

METHOD FOR PRODUCING TILE CARPET

INDUSTRIAL UTILIZATION FIELD

The present invention relates to a method for producing a tile carpet such as tufted carpet or needle punch carpet used as a material to be laid on the floor of a store, office, house or the like.

PRIOR ART

Tile carpet is a plate-like carpet of a small area capable of being combined in a plural number as laying units to constitute floor surfaces of various sizes and shapes. It is advantageous in that the laying work is easy, the tile carpet is easy to carry and permits an easy and partial replacement, and various design constructions can be effected by combinations of colors and shapes. But it is required that the tile carpet be difficult to undergo displacements and dimensional changes caused by changes in temperature or stresses induced by walking on the carpet.

Generally, as means for improving the standing stability (laying stability), shape stability and dimensional stability of tile carpet, there is adopted a method wherein a thermoplastic resin composition such as an asphaltic, ethylene/vinyl acetate copolymer or polyvinyl chloride composition is applied in a molten condition to the back side of a carpet cloth formed of a pile yarn-implanted fibrous material, using a doctor knife, or a method wherein such composition is once formed into sheet by means of an extruder or a calendering equipment and then laminating the sheet to the carpet cloth under heating to form a laminate having a lining layer.

According to the former, conventional method for lining the carpet cloth, the carpet cloth is placed on an endless belt and a melted thermoplastic resin composition is applied onto the carpet cloth using a doctor knife or the like while the endless belt is allowed to travel continuously.

The latter, conventional method involving once forming a sheet of thermoplastic resin composition and then laminating it to the carpet cloth under heating is not so popular because this method is uneconomical in point of heat energy due to repeated heating and cooling.

According to the conventional method of applying a melted thermoplastic resin composition onto the carpet cloth which is travelling, the melt which has been brought into contact with the carpet cloth is difficult to cool and solidify because the carpet cloth is a heat insulating material. This is apt to cause deformations such as wrinkles or surface strains of the carpet obtained, in the case of a carpet cloth of low heat resistance. Further, unsolidified melt of the composition may enter irregular concaves and convexes on the carpet surface or between stiches of the carpet surface which are not always arranged in a regular form, thus sometimes resulting in that the lining layer is substantially not uniform in its thickness. That is, it becomes impossible to obtain a uniform coating, and this poses a problem in the quality control of carpet.

Thus, in such conventional method, it is relatively easy for the lining melt to enter between the carpet cloth stiches. This means that the melt is apt to deteriorate the carpet cloth thermally, coupled with the fact that the carpet cloth is a heat insulator. On the other hand, such a phenomenon leads to a further improvement of the bonding strength between the lining layer and the carpet cloth.

In the case of using a lining material whose melt viscosity is relatively low, if there is adopted a method wherein the lining material melted and applied onto the carpet cloth and the lining layer thickness is adjusted by pushing a doctor knife or the like against the lining layer, as in the foregoing conventional method, the melted lining material may flow too much and excessively permeate into the carpet cloth.

OBJECT OF THE INVENTION

It is the object of the present invention to provide a method for producing a tile carpet superior in both shape stability and dimentional stability and also superior in the bonding strength between a lining layer and a carpet cloth, further, capable of being easily laid on a floor, and which method permits adjustment to obtain a uniform thickness of the lining layer.

GIST OF THE INVENTION

The present invention resides in a method for producing a tile carpet, which method comprises applying a heat-melted amorphous olefin polymer composition (A) at least once onto a travelling, releasable endless belt, laminating a carpet cloth which has been sealed beforehand with an amorphous olefin polymer composition (B) onto the coating surface which is in a melted state, to obtain an integral laminate, then cooling the laminate forcibly, peeling the laminate from the endless belt and cutting it into a tile shape.

In the above method, an intermediate cloth may be inserted between lining layers. In this case, heat-melted amorphous olefin polymer composition (A) is applied in plural times according to the number of such intermediate cloth layer to be inserted.

Preferably, the foregoing sealed carpet cloth is obtained by feeding the amorphous olefin polymer composition (B) in a melted state onto the surface of a rotating coating roll and then pushing the back of the carpet cloth against the said surface, thereby allowing the said composition to be impregnated into the carpet cloth to seal the cloth.

Further, it is preferable that the amorphous olefin polymer composition (A) applied onto the endless belt be heated forcibly until reaching the lamination process with respect to the carpet cloth.

Explanation of Reference Numerals

1 . . . Carpet cloth

2 . . . roll coater

3 . . . endless belt

4 . . . coating roll

Figure 1:
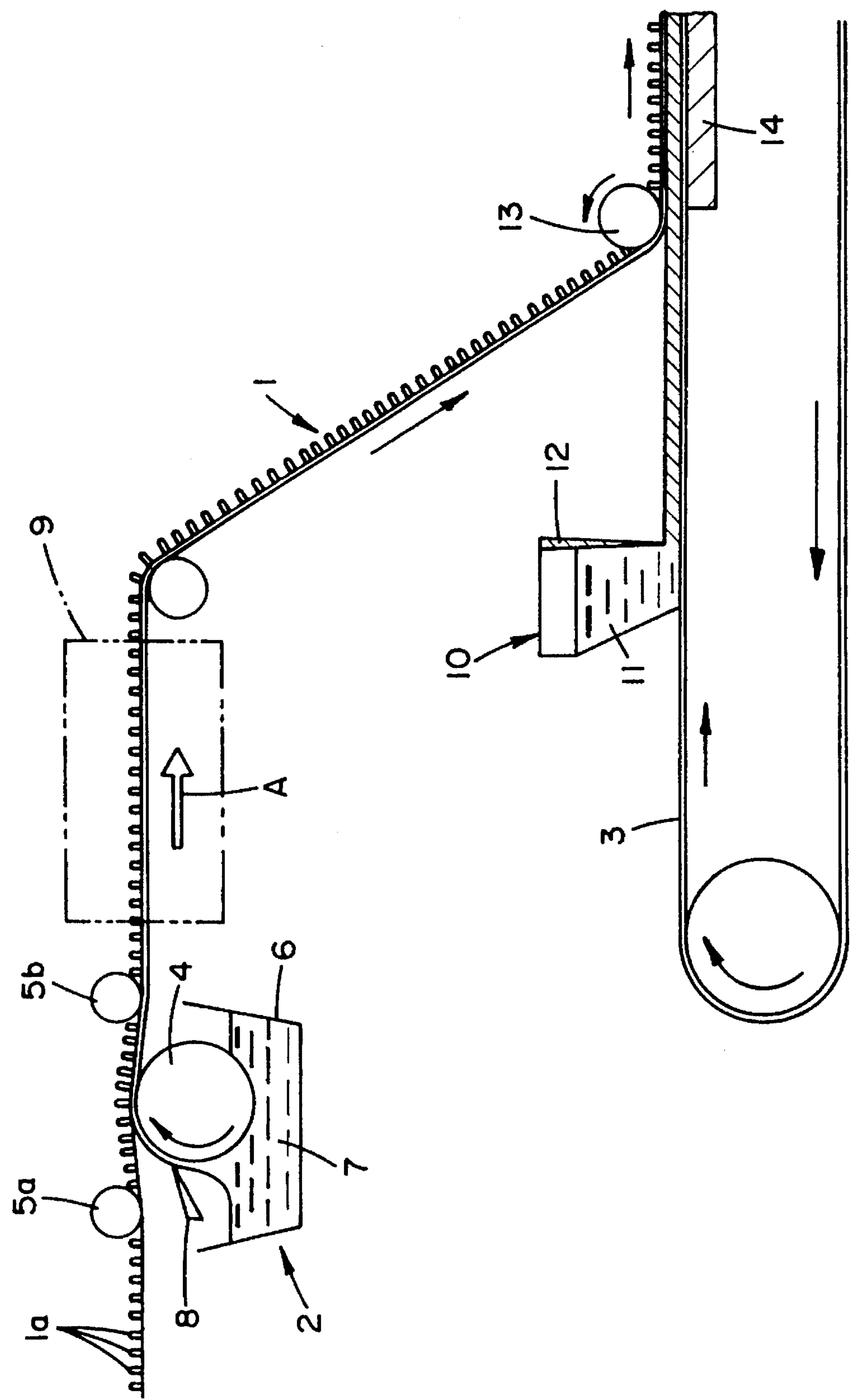
FIG. 1 is a schematic process chart showing an embodiment of the present invention.

5*a*, 5*b* . . . hold-down rolls

6 . . . heating bath

7 . . . amorphous olefin polymer composition for sealing

8 . . . doctor

9 . . . cooling zone

10, 10*a*, 10*b* . . . knife coaters

11, 11*a*, 11*b* . . . amorphous olefin polymer composition for lining

12, 12*a*, 12*b* . . . doctor knives

13, **13*a*, 13*b*** . . . laminating rolls

14 . . . cooling plate

15 . . . heating plate

16 . . . non-woven glass fabric

17 . . . glass fabric

PREFERRED EMBODIMENTS OF THE INVENTION

The present invention will be described below in more detail.

The surface of the travelling endless belt used herein has releasability imparted thereto by a suitable means, thereby permitting the lining layer coated thereon to be released easily from the endless belt. Although the material of the endless belt is not specially limited, a material having resistance to the heat of melt is preferred.

The amorphous olefin polymer composition (A) applied in a melted state onto the travelling, releasable endless belt contains an amorphous olefin polymer, so is characterized by being low in both melt temperature and melt viscosity. The amorphous olefin polymer composition (B) for pre-sealing the carpet cloth also contains an amorphous olefin polymer, so is characterized by being low in both melt temperature and melt viscosity.

The lining composition is applied in melted state onto the travelling, releasable endless belt and, prior to lamination thereof with the carpet cloth, its thickness is adjusted using a suitable means e.g. doctor knife, whereby the amount of the lining composition coated can be rendered uniform.

The surface (upper surface) of the amorphous olefin composition melt-applied onto the travelling, releasable endless belt is in contact with air, so is cooled to some extent though it is in a melted state. Therefore, even when the melted coating of the composition (A) is laminated to the carpet cloth, there is no fear of overheating of the carpet cloth. For this reason, coupled with the low melting temperature of the lining composition used in the invention, the tile carpet obtained according to the method of the present invention is superior in both shape stability and dimensional stability even in the use of a carpet cloth which is low in heat resistance.

After lamination with the carpet cloth, the coated and melted lining layer is cooled forcibly. This cooling is attained by cooling the releasable endless belt by using a suitable means, e. g. cooling means of the water cooling type. Since the coated and melted lining layer is in direct contact with the endless belt, once the endless belt is cooled, the heat of the lining layer is removed rapidly through the cooled belt, resulting in that the lining layer is cooled and solidified. Thus, also in this point, there is little fear of overheating of the carpet cloth.

The carpet cloth to be laminated to the lining layer is pre-sealed with the amorphous olefin polymer composition (B). Like the amorphous olefin polymer composition used as the lining composition, the polymer composition for sealing used in the invention also contains an amorphous olefin polymer. Since both compositions thus contain substances of the same sort, both are highly compatible with each other. For this reason, the carpet cloth used in the invention easily adheres to the lining layer and the bonding strength between the two is high. Because of such easy bonding, the pre-sealed carpet cloth can be laminated to the lining layer melt-coated on the endless belt merely by using a simple laminating means, for example using a laminating roll, that is, merely by the application of a slight pressure. Besides, a sufficient bonding strength is developed by only such a simple lamination.

It is essential that the amorphous olefin polymer composition (B) used for sealing contain an amorphous olefin polymer. The amorphous olefin polymer indicates a polymer or copolymer of olefin(s) such as ethylene, propylene or butene, which is substantially amorphous, not having crystallinity. As examples there are mentioned polymers called APAO (amorphous poly-alpha-olefin), including APP (amorphous polypropylene) and amorphous butene polymer. These polymers may be used each alone or as a mixture. Usually, these polymers have a melt viscosity in the range from 300 to 30,000 cP at 190° C., a number average molecular weight in the range from 1,000 to 30,000 and a softening point in the range from 100° to 170° C. (as measured by the ring and ball method). In comparison with EP rubber, the polymers in question are extremely low in both melt viscosity and molecular weight and are thus clearly distinguishable substances. The amorphous olefin polymer content of the composition is not lower than 5 wt %, preferably not lower than 10 wt %. A lower content is not desirable because it will be difficult to obtain a sufficient bonding strength between the carpet cloth and the lining layer even if the same amorphous olefin polymer is used in both the sealer and the lining composition. Although the upper limit of such polymer content is not specially limited, it is usually not higher than 95 wt %, preferably not higher than 90 wt %.

It is desirable that the amorphous olefin polymer composition (B) used for sealing in the present invention contain a tackifier resin and a filler as essential components in addition to the amorphous olefin polymer.

As the tackifier resin, any of petroleum resins, natural resins, etc. may be selected as desired. As examples of the filler there are mentioned calcium carbonate, clay, talc and diatomaceous earth. The proportion of the tackifier resin is preferably 0% to 30% by weight on the assumption that the entire composition is 100% by weight. A larger proportion thereof is not desirable because the low melt temperature and melt viscosity characterisitics of the amorphous olefin polymer will be impaired. On the other hand, the proportion of the filler is preferably 0% to 90% by weight, assuming that the entire composition is 100% by weight. If the filler proportion exceeds 90% by weight, the low melt temperature and melt viscosity characteristics of the amorphous olefin polymer will be impaired, so such larger proportion is not desirable.

In addition, additives whose addition to the sealer for carpet cloth is known, such as, for example, flame retardant, coloring agent and antioxidant, may be used as necessary.

As to the polymer composition (B) for sealing, it is preferable that a melt viscosity thereof in the temperature range from its melt temperature up to +50° C. be in the range from 100 to 30,000 cP, more preferably 300 to 10,000 cP. If such melt viscosity of the composition is lower than the said range, the sealer will permeate from the back of the carpet cloth into the surface thereof, resulting in impairment of the carpet surface texture. Conversely, if such melt viscosity is too high, there will not be attained sufficient permeation of the sealer, that is, a satisfactory sealing effect will not be obtained. Thus, both such values are not desirable.

The carpet cloth to be sealed is not specially limited if only it is used for tile carpet. Examples are tufted carpet cloth, knitted carpet cloth, needle punch carpet cloth and felt carpet cloth. Usually, tufted carpet cloth is preferred. The material of the carpet cloth is not specially limited, either. As examples of the carpet cloth material there are mentioned polyesters such as PET, polyolefins such as polypropylene, and polyamides such as nylon.

It is preferable that the amount of the polymer composition (B) to be applied to the carpet cloth be in the range from 200 to 2,000 g/m$^2$, more preferably 400 to 1,500 g/m$^2$. If the amount thereof is too small, there will not be attained a satisfactory sealing effect. Conversely, if it is too large, a marked heat shrinkage will occur in the carpet cloth after coating, the cooling and solidifying will be delayed, thus requiring a large-scale cooling equipment for providing a continuous processing line up to the formation of -the next lining layer, further, on-line conveyance is difficult because of increase in rigidity after solidifying.

A typical example of the amorphous olefin polymer composition (B) is a composition comprising 30 wt % of an amorphous polypropylene (melt viscosity at 190° C.: 1,500 cP, number average molecular weight: 10,000, softening point: 152° C.), 10 wt % of a petroleum resin and 60 wt % of calcium carbonate. This composition exhibits a melt viscosity of 4,200 cP at 190° C.

On the other hand, it is also essential that the amorphous olefin polymer composition (A) to be applied onto the endless belt contain an amorphous olefin polymer. Examples of such amorphous olefin polymer are polymers or copolymers of olefins such as ethylene, propylene and butene, like the amorphous olefin polymer contained as an essential component in the amorphous olefin polymer composition (B) which is used as the sealer explained above. These polymers or copolymers are required to be substantially amorphous, not having crystallinity. More concrete examples are those called APAO (amorphous poly-alpha-olefin), including APP (amorphous polypropylene) and amorphous between polymer. These polymers may be used each alone or as a,mixture. Usually, these polymers have a melt viscosity in the range from 300 to 30,000 cP at 190° C., a number average molecular weight in the range from 1,000 to 30,000 and a softening point in the range from 100° to 170° C. (as measured by the ring and ball method). As compared with EP rubber, these polymers are extremely low in both melt viscosity and molecular weight and thus are clearly distinguishable substances.

The amorphous olefin polymer contained in the composition (A) is of the same kind as the amorphous olefin polymer contained as an essential component in the amorphous olefin polymer composition (B) used as the sealer explained previously, but both are not always required to be the same. More particularly, although it is a preferred mode to use the same amorphous olefin polymer, no limitation is made thereto. There may be used different olefin polymers or copolymers which are substantially amorphous, not having crystallinity, and each have values of melt viscosity at 190° C., number average molecular weight and softening point falling under the respective ranges specified herein.

The proportion of the amorphous olefin polymer contained in the composition (A) is not smaller than 5 wt %, preferably not smaller than 10 wt %. A smaller proportion thereof is not desirable because it will be difficult to obtain a sufficient bonding strength between the sealed carpet cloth and the backing layer even if the same amorphous olefin polymer is used in both the sealer and the lining layer. The upper limit of such polymer content is not specially limited, but is usually not higher than 95 wt %, preferably not higher than 90 wt %.

It is preferable that the amorphous olefin polymer composition (A) used as the lining composition in the present invention contain a wax and a filler as essential components in addition to the amorphous olefin.

As the wax there may be selected any of synthetic hydrocarbon waxes, natural waxes, etc. As examples of the filler there are mentioned calcium carbonate, clay, talc and diatomaceous earth. The proportion of the wax is preferably in the range of 0 to 30 wt % on the assumption that the entire composition is 100 wt %. A larger proportion thereof is not desirable because the melt viscosity of the composition will become too low. A preferred proportion of the filler is in the range of 0 to 90 wt %, assuming that the entire composition is 100 wt %. If the filler proportion exceeds 90 wt %, the melt viscosity of the composition will become too high, thus resulting in impairment of the low melt temperature and melt viscosity characteristics of the amorphous olefin polymer.

In addition, additives whose addition to the lining composition for carpet cloth is known, such as, for example, flame retardant, coloring agent and antioxidant, may be used as necessary.

At the time of application of the lining composition (A), it is preferable that the melt viscosity thereof be in the range of 2,000 to 100,000 cP, more preferably 10,000 to 500,000 cP. If the melt viscosity is lower than this range, the composition will flow too much when applied onto the endless belt, while a too high melt viscosity will make the application of the composition onto the endless belt difficult. Thus, both such values are not desirable.

A typical example of the amorphous olefin polymer composition (A) for lining is a composition comprising 27 wt % of an amorphous polypropylen (melt viscosity at 190° C.: 8,000 cP, number average molecular weight: 4,500, softening point: 140° C.), 8 wt % of paraffin wax and 65 wt % of calcium carbonate. This composition exhibits a melt viscosity of 3,800 cP at 190° C.

The present invention will be described below with reference to the drawings.

FIG. 1 illustrates a first embodiment of the present invention. In the same figure, the reference numeral 1 denotes a band-like carpet cloth with pile yarn la implanted therein. While the carpet cloth 1 travels continuously in the direction of arrow A at a predetermined constant speed, it is sealed by means of a roll coater 2 disposed on an upstream side, and thereafter it is lined by lamination on an endless belt 3 mounted on a downstream side.

A coating roll 4 of the roll coater 2 is disposed between a pair of front and rear hold-down rolls 5*a*, 5*b* which are in contact with the surface side of the carpet cloth 1. The lower portion of coating roll 4 is immersed in a heat-melted amorphous olefin polymer composition (B) indicated at 7 and contained within a heating bath 6, while the upper portion thereof is kept in contact with the back of the carpet cloth 1 under a predetermined certain pressure. With rotation of the coating roll 4, the polymer composition 7 is drawn up onto the surface of the roll and adhered thereto continuously while the amount thereof to be used for coating is adjusted to a predetermined certain value by means of a doctor 8. The polymer composition 7 thus adhered in a melted state onto the roll surface is then pushed against the back of the carpet cloth 1 and rolled onto the cloth back continuously. Numeral 9 denotes a cooling zone. The carpet cloth 1 which has passed through the cooling zone 9 assumes a sealed state because the resin composition applied thereto in the previous stage is cooled and solidified.

The surface of the coating roll 4 is heated, for example, by passing steam through the interior thereof, whereby the polymer composition 7 is prevented from being cooled and solidified on the roll 4, and the polymer composition 7 is rolled onto the carpet cloth 1 in a good melted state. The doctor 8 is also heated by electric heat for example to prevent solidifying and accumulation of the polymer composition 7 which has been raked up by the doctor. The heating temperature is usually set at a value in the range from the melting temperature of the polymer composition (B) 7 up to about 50° C. It is preferable that the coating roll 4 be rotated in the same forward direction as the travelling direction of the carpet cloth 1 and that the peripheral speed thereof be set at a value in the range of 100% to 200% of the travelling speed of the carpet cloth 1. Particularly, by setting the peripheral speed of the coating roll a little higher than the travelling speed of the carpet cloth 1, the permeation of the polymer composition 7 from the surface of the roll 4 to the carpet cloth 1 is promoted physically. Further, since the cooling zone 9 is present, distortions such as thermal shrinkage of the carpet cloth after sealing is prevented.

On the other hand, the endless belt 3 is constituted by a material superior in surface lubricity such as fluorine resin or silicone resin-coated glass cloth belt, polyimide fiber belt, wire net belt or steel belt, and it is set so as to travel continuously in synchronism with the carpet cloth 1. A knife coater 10 is mounted on above the endless belt 3 on the forward movement start end side of the belt, whereby a heat-melted amorphous olefin polymer compositon (A) for lining, indicated at 11, is fed continuously onto the belt 3 which is travelling, and is adjusted to a predetermined thickness by means of a doctor knife 12. In the forward movement section of the endless belt 3 rearer than the mounted position of a laminating roll 13 there is disposed a flat cooling plate 14 provided with both a suction mechanism and a water-cooling mechanism. The belt 3 travels in close contact with the upper surface of the cooling plate 14, and during this travelling process, the cooling of the polymer composition (A) 11 which has been applied onto the belt 3 is promoted. The suction mechanism of the cooling plate 14 has a large number of small holes formed in the surface thereof, and for example by suction through these small holes, the belt 3 is brought into close contact with the surface of the cooling plate 14 under a suction force of a magnitude not impairing the movement of the belt 3.

On a downstream side spaced a predetermined distance from the knife coater 10, the sealed carpet cloth 1 is laminated continuously to the coating surface of the polymer composition (A) 11 on the belt 3 through the laminating roll 13. The thus-laminated polymer compositin (A) 11 is separated from the belt 3 in a downstream position (not shown) to constitute a lining layer integral with the carpet cloth 1. Since the sealing resin applied previously to the carpet cloth is cooled and solidified to a considerable extent until the lamination of the carpet cloth with the lining layer, so it is desirable that this laminating position be set in a region in which the surface temperature of the polymer composition (A) 11 coated on the belt 3 is held at a level not lower than the softening point, more preferably the melting point, thereof.

For the coating there may be used a coating apparatus other than the knife coater illustrated in the drawing, such as a roll coater for example. But it is desirable that a heating mechanism be attached to the sump portion and coater portion of the coating apparatus to avoid solidifying of the polymer composition (A) 11 caused by a decrease of temperature or unevenness in coating caused by an increase of viscosity. Preferably, the heating temperature is set at a value in the range from the melting temperature of the polymer composition 11 up to about +50° C. Further, it is preferred that the amount of the polymer composition (A) 11 to be applied onto the belt 3 be in the range of 500 to 4,000 g/m$^2$. If it is too small there will not be obtained satisfactory physical properties such as standing stability and dimensional stability to be attained by the lining layer, while if the said amount is too large, hardening will be delayed, so that a decrease of the processing speed or the necessity of increasing the cooling capacity is unavoidable, and the material cost becomes high.

The thus-lined carpet cloth 1 is then cut into a predetermined size to afford a tile carpet. In this tile carpet, since the sealing resin layer and the lining layer are of the same polymer composition, both layers are strongly bonded together under a high affinity and there is no fear of ply separation. Besides, since the resin component in both layers is an amorphous olefin polymer, the tile carpet has a high heat resistance and a good low-temperature characteristic. Further, because of uniform sealing, the tile carpet exhibits good pile holding property (thread extraction strength) and anti-fuzz property and also exhibits very superior standing (shape) stability and dimensional stability based on the lining layer of uniform thickness.

In the present invention, in order to further improve the dimensional stability of the tile carpet, there may be adopted a construction in which two or more lining layers are laminated together and an intermediate cloth(s) which is, for example, woven or non-woven cloth of glass fibers or heat-resisting polymer fibers such as polyester fibers, is inserted between adjacent such lining layers. In this case, the thickness of each constituent layer of the lining layer laminate becomes smaller and therefore it is required to enhance the thickness accuracy. In this connection a high thickness accuracy can be attained by utilizing the endless belt 3 for the formation of the lining layers and by using as the material of the lining layers the amorphous olefin polymer composition (A) 11 which is low in melt viscosity and can be spread easily.

Such intermediate cloth has voids so that a melt of the amorphous olefin polymer composition (A) as the lining composition can enter the intermediate cloth somewhat easily. As the case may be, the said melt may permeate sufficiently into the intermediate cloth. As a result, the intermediate cloth(s) thus inserted fully bonds to the lining composition.

Figure 2:
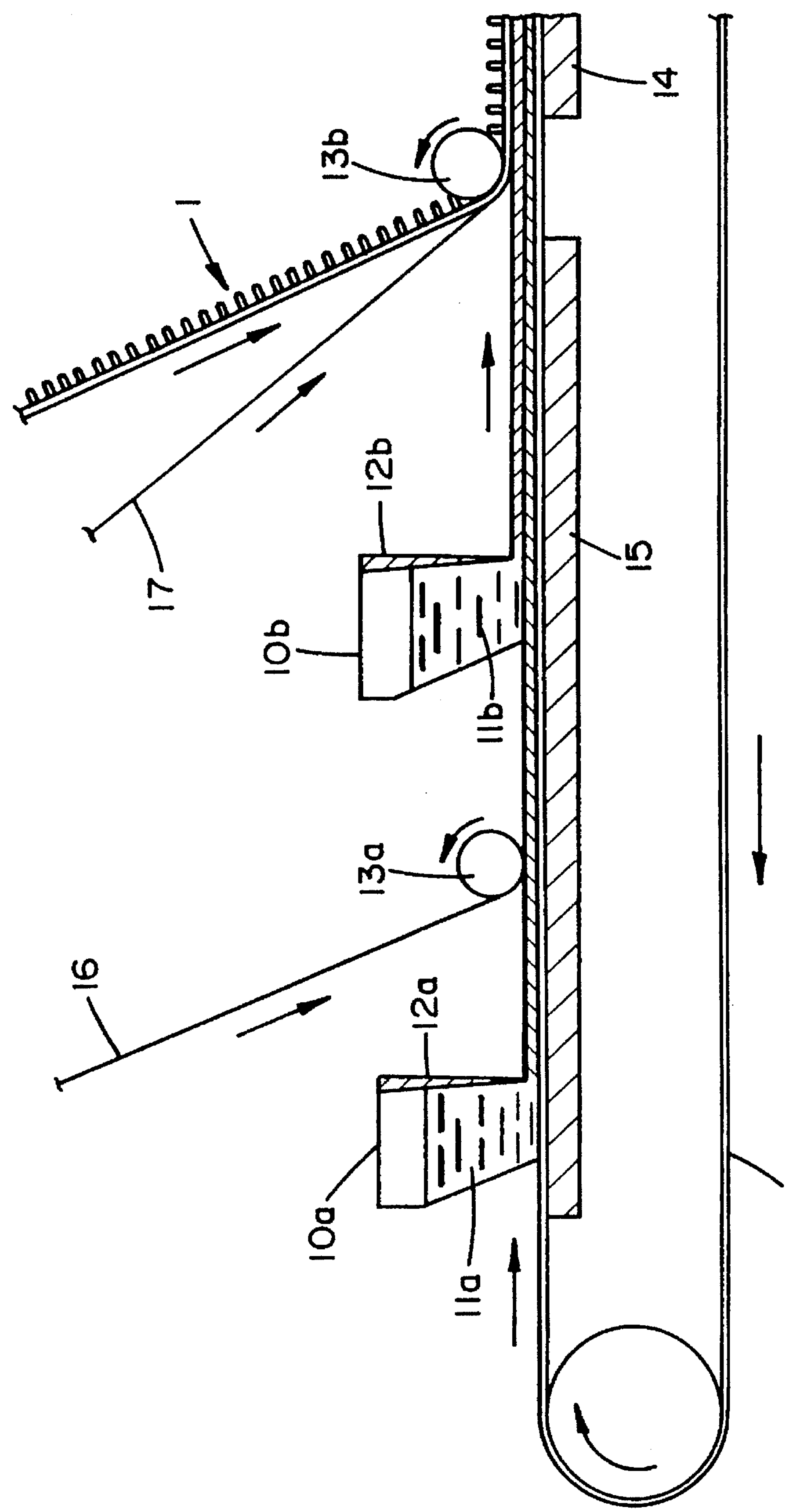
FIG. 2 is a schematic process chart showing another embodiment of the present invention.

FIG. 2 illustrates a second embodiment of the present invention in which two sheets of such intermediate cloth are each inserted between lining layers. In this second embodiment, an endless belt 3 having the same construction as in the first embodiment and adapted to travel continuously comes into close contact, during its forward movement, successively with the upper surface of a heating plate 15 disposed on the upstream side and with the upper surface of a cooling plate 14 disposed on the downstream side at a slight spacing from the heating plate 15. Above the belt 3 are disposed two knife coaters **10*a* and 10*b* at a predetermined spacing from each other within the mounted section of the heating plate 15. Further, laminating rolls 13*a* and 13*b* are disposed respectively between both knife coaters 10*a* and 10*b* and between both plates 15 and 14**.

In the knife coater **10*a*, a heat-melted, amorphous olefin polymer composition (A) 11*a* is applied continuously onto the belt 3 at a predetermined thickness through a doctor knife 12*a*. Then, to the resulting coating surface is laminated non-woven glass cloth 16 continuously through the laminating roll 13*a*, and onto the thus-laminated non-woven glass cloth 16 is applied a heat-melted, amorphous olefin polymer Composition (A') 11b same as the above composition continuously at a predetermined thickness through a doctor knife 12b in the knife coater 10b. Further, to the resulting coating surface of the resin composition (A') 11b are laminated both woven glass cloth 17 and the foregoing sealed cloth 1 through the laminating roll 13b in such a manner that the former underlies the latter. The non-woven glass cloth 16, woven glass cloth 17 and carpet cloth 1 are adapted to travel in synchronism with the belt 3**.

In this embodiment, since the polymer compositions (A) 11a and (A') 11b are applied onto the endless belt 3 in two separate stages with the non-woven glass cloth 16 therebetween, the distance from the initial coating of the polymer compositon (A) 11a up to the lamination with the carpet cloth 1 is longer than in the previous embodiment. In this section, however, since the belt 3 travels over the heating plate 15, the applied polymer compositions (A) 11a and (A') 11b are prevented from getting cold, thus ensuring their good adhesion to the carpet cloth 1. This laminating operation is followed by separation of the laminate from the belt 3 and subsequent cutting thereof into a predetermined size to obtain a tile carpet. In this tile carpet, the nonwoven glass cloth 16 is interposed between the two lining layers formed of the amorphous olefin polymer compositions (A') 11a and (A') 11b, and the woven glass cltoh 17 is interposed between the sealing resin layer and the upper lining layer. An extremely high dimensional stability based on those two sheets of intermediate cloth is attained, and the thickness of each constituent layer of the laminate structure is very uniform, thus affording a high commodity value.

The amorphous olefin polymer compositions (A) 11a and (A') 11b are not always required to be the same as long as they satisfy the conditions preferred to previously, although it is desirable for the two to be the same.

EFFECTS OF THE INVENTION

According to the present invention, if only the polymer composition for sealing and that for lining are supplied in a melted state and in a large amount, it is possible to effect coating stably and continuously in uniform composition over a long time, and in sealing, the polymer composition permeates the carpet cloth to a satisfactory extent, while in lining, there is attained coating of a uniform thickness onto the endless belt and a lining layer of a uniform thickness free of scatter can be formed. Besides, the length of the belt travelling section required for cooling of the lining layer, and hence the production line, can be made smaller by the cooling action. Consequently, the manufacturing efficiency and the space efficiency are so much enhanced. Moreover, the sealing resin layer in the carpet cloth and the lining layer are firmly bonded together to prevent the occurrence of ply separation, and deformation and deterioration are difficult to occur because the lining layer has a high heat resistance and a good low-temperature characteristic. Thus, a tile carpet of high quality superior in all of standing stability, shape and dimensional stability, durability, pile holding property and anti-fuzz property can be produced easily and efficiently.

Preferably, the polymer composition (B) for sealing is applied onto the surface of a rotary coating roll, then in a melted state at a low viscosity, is rolled onto the back of the carpet cloth under pressure induced by the coating roll. By so doing, the sealing polymer composition is permeated sufficiently into the carpet cloth. Besides, since it is applied in a constant amour onto the coating roll, the amount thereof applied to the carpet cloth is also constant, whereby uniform sealing can be effected. Further, since the resin composition thus used for sealing can be effected. Further, since the resin composition thus used for sealing is easily solidified by cooling without the necessity of curing it is possible to set a single continuous processing line from the sealing up to the formation of a lining layer while the carpet cloth is allowed to travel.

If a composition containing not only the amorphous olefin polymer but also a tackifier resin and a filler is used as the amorphous olefin polymer composition (B), it becomes possible to enhance the sealing effect because the affinity for the carpet cloth is improved by the tackifier resin; besides, the enhancement of strength and the development of a flame retarding action can be expected by the use of the filler. Likewise, if a composition containing not only the amorphous olefin polymer but also a wax and a filler is used as the amorphous olefin polymer composition (A), the separation of the lining layer from the endless belt becomes easier under the releasing action of the wax; besides, the wax functions to decrease the melt viscosity and keep the fuming property low. Moreover, the same effect as above attained by the filler can also be expected.

It is preferable that the polymer composition (A) applied onto the endless belt be heated forcibly until reaching the laminating process with respect to the carpet cloth. This is for the following reason. For example, in the case where two or more lining layers are laminated together and an intermediate cloth is inserted therebetween for the purpose of further improving the dimensional stability of the tile carpet obtained, the distance from the application of the polymer composition (A) onto the endless belt up to the lamination of the carpet cloth thereto becomes longer, but even in this construction, the polymer compositon (A) thus applied onto the belt is prevented from being cooled by the heating plate in this processing section, so that a high adhesion thereof to both the carpet cloth and the intermediate cloth is ensured.

We claim:

1. A method for producing a tile carpet, which method comprises sealing a carpet cloth by the applying thereon of a heated first olefin polymer composition (B); cooling said first olefin polymer composition (B); applying a second heat-melted, olefin polymer composition (A) at least once onto a traveling releasable endless belt, then laminating said carpet cloth which has been previously sealed with said first olefin polymer composition (B) onto the coating surface of the composition (A) which is in a melted state in the absence of an application of heat to obtain an integral laminate; and forcibly cooling the laminate at the point of lamination into a tile shape.

2. The method of claim 1, wherein said second olefin polymer composition includes at least two layers having at least one intermediate cloth layer adhesively interposed therebetween.

3. The method of claim 2, wherein said at least one intermediate layer is constituted of glass fibers or heat-resisting polymer fibers.

4. The method of claim 2, wherein said cloth layer is a woven or non-woven cloth enabling said second polymer composition to pass therethrough so as to laminate with said first polymer composition.

5. The method of claim 1, wherein said first olefin polymer composition (B) and said second olefin polymer composition (A) each comprise an amorphous olefin polymer composition.

6. The method of claim 5, wherein the content of the amorphous olefin polymer in said amorphous olefin polymer composition (A) is in the range of 5% to 95% by weight.

7. The method of claim 5, wherein said amorphous olefin polymer composition (A) comprises the amorphous olefin polymer, a wax and a filler.

8. The method of claim 5, wherein said amorphous olefin polymer composition (A) comprises, based on 100% by weight of the entire composition, 5–95% by weight of the amorphous olefin polymer, 0–30% by weight of a wax and 0–90% by weight of a filler.

9. The method of claim 5, wherein the content of the amorphous olefin polymer in said amorphous olefin polymer composition (B) is in the range of 5% to 90% by weight.

10. The method of claim 5, wherein the amorphous olefin polymer composition (B) comprises the amorphous olefin polymer, a tackifier resin and a filler.

11. The method of claim 5, wherein said amorphous olefin polymer composition (B) comprises, based on 100% by weight of the entire composition, 5–90% by weight of the amorphous olefin polymer 0–30% by weight of a tackifier resin and 0–90% by weight of a filler.

12. The method of claim 5, wherein each said amorphous olefin polymer is an amorphous poly-alpha-olefin.

13. The method of claim 12, wherein said amorphous poly-alpha-olefin is amorphous propylene or butene polymer.

* * * * *